US008410194B1

(12) United States Patent
Orts et al.

(10) Patent No.: US 8,410,194 B1
(45) Date of Patent: Apr. 2, 2013

(54) BIOPOLYMER ADDITIVE

(75) Inventors: William J. Orts, Burlingame, CA (US); Gregory M. Glenn, American Canyon, CA (US); Syed Hussain Imam, Walnut Creek, CA (US); Robert E. Sojka, Twin Falls, ID (US); C. Steven Sikes, Eugene, OR (US); Mark A. Hochwalt, Chesterfield, MO (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 224 days.

(21) Appl. No.: 12/757,498

(22) Filed: Apr. 9, 2010

(51) Int. Cl.
*C08K 17/20* (2006.01)
(52) U.S. Cl. ......... 523/132; 252/88.1; 252/88.2; 524/13
(58) Field of Classification Search .................... 523/132
See application file for complete search history.

(56) References Cited

U.S. PATENT DOCUMENTS

| 4,801,635 | A | 1/1989 | Zinkan |
|---|---|---|---|
| 5,242,248 | A | 9/1993 | Bramwell |
| 5,514,412 | A | 5/1996 | McArdle |
| 5,629,055 | A | 5/1997 | Revol et al. |
| 6,395,051 | B1 | 5/2002 | Arnold et al. |
| 6,562,882 | B2 | 5/2003 | Harrison |
| 6,669,752 | B2 | 12/2003 | Arnold et al. |
| 6,825,313 | B2 | 11/2004 | Sikes |
| 7,595,002 | B2 | 9/2009 | Sikes et al. |
| 7,595,007 | B2 | 9/2009 | Sikes et al. |
| 2004/0074271 | A1* | 4/2004 | Krysiak et al. ............ 71/27 |
| 2009/0205071 | A1* | 8/2009 | Bughrara .................. 800/278 |

* cited by examiner

*Primary Examiner* — Necholus Ogden, Jr.
(74) *Attorney, Agent, or Firm* — John Fado; Robert D. Jones; Lesley Shaw

(57) ABSTRACT

The biopolymer additive, in combination with water, functions as a soil conditioner that affects soil erosion and water infiltration. The biopolymer additive is derived from complex galactomannon-rich succulent plants. The succulent-derived (biopolymer) additive (SDA) may be used alone or in combination with polymers and copolymers of polyacrylamide (PAM). The combination of the SDA and PAM has a synergistic effect so that the resulting composition yields unexpected results and is a more effective treatment than either SDA or the PAM alone.

14 Claims, 4 Drawing Sheets

BIOPOLYMER ADDITIVE

FIELD OF THE INVENTION

The present invention relates to soil flocculating agents, coagulants and stabilizers. Specifically, the current invention relates to succulent plant-derived additives (SDAs) that comprise a biopolymer soil conditioner. SDAs may be used as soil-binding biomaterials that, either alone or in combination with known polymers, act to condition soil and thereby prevent or retard soil erosion and water infiltration.

BACKGROUND OF THE INVENTION

The field of soil conditioners was changed in the 1950's by the introduction of synthetic polymers, especially linear polymers and copolymers of polyacrylamide (PAM) and poly (acrylic acid). These soil binding and soil flocculating agents amended soil via aggregation of particulates and thereby stabilized soil surface structure. By the 1980's and early 1990's, significant research had established PAM and its copolymers as a viable soil conditioner.

Currently, PAM is added to irrigation water as a means of treating irrigated soil. Some studies indicate that the use of PAM reduces irrigation runoff as much as 97% while improving water infiltration. In operation, high molecular weight anionic PAM is added to irrigation water at very low concentration (at 2-10 g m-3, or 2-10 ppm) during the first several hours of irrigation. Soil-amending polymers are generally dissolved in irrigation water at doses of 2 to 20 parts per million, which converts to about 2 to 10 lbs per acre. Erosion is reduced because the polymer additive treats the soil that is directly in contact with the moving water; i.e., soil structure is improved in the all-important 1-5 mm thick layer at the soil/water interface of the field surface contacted by flowing water. During furrow irrigation, these polymers bind to soil particles causing them to settle out and "seal" the furrow from further erosion.

Since toxic pesticides and herbicides are transported via soil sediment to open waterways, preventing sediment runoff also prevents chemical runoff. PAM has been shown to sequester biological and chemical contaminants in runoff sediment, thereby providing significant potential for reduced spread of phytopathogens, animal coliforms and other organisms of public health concern.

In addition to conventional soil erosion control, PAM is also used in a wide variety of other applications. For example, PAM is effective in sealing unlined water-delivery canals to reduce water seepage or infiltration losses. Other applications include controlling dust emissions at (for example) construction sites, rural roads, deforested areas—especially after fires or natural disasters, and at temporary helicopter landing pads and military air strips.

However, there are multiple concerns associated with the widespread use of PAM. In many applications PAM may be difficult to work with and apply effectively. High molecular weight polymers like PAM exhibit corresponding high viscosities and typically form gelatinous masses. These masses are difficult to manipulate and meter into (for example) irrigation water or other carrier mediums.

The main environmental concern revolves around polymer purity, and issues related to biodegradation and/or accumulation. PAM is conventionally derived from petroleum and therefore biodegrades very slowly. The long-term effect of PAM on living organisms in the soil application context is relatively unknown. The base monomer, acrylamide, is a hazardous, reactive monomer that is a known neurotoxin and suspected carcinogen. Although PAM providers take steps to ensure that levels of potentially dangerous monomers are well within safety limits, it is evident that alternative materials would broaden the potential market for soil additives.

Potential alternatives to PAM, such as polysaccharides, amino acid polymers and other modified biopolymers have been introduced to provide soil amending properties similar to PAM. These alternatives rapidly degrade and provide marketing advantages due to the relative safety of natural compounds. Among these are natural and modified polysaccharides, polyamino acids (U.S. Pat. Nos. 7,595,002 and 7,595,007), starch xanthate, and chitosan. However, these alternatives are relatively expensive to produce—particularly in large quantities.

The need exists for additional PAM alternatives that either reduce or eliminate the use of PAM. The alternatives should be at least competitive with (and preferably less expensive) than conventional PAM applications. The current invention comprises a formulation of novel polysaccharides, specifically complex galactomannan-rich polysaccharides derived from succulent plants. Succulent plant material suitable for use in the current formulation is available as an inexpensive and plentiful agricultural by-product. Application of the formulation results in soil flocculation properties comparable to PAM, without the potential effects associated with a synthetic petroleum product. The biopolymers and additives of the current invention improve the handling characteristics and reduce the cost and environmental impacts of conventional commercially-available flocculants.

SUMMARY OF THE INVENTION

The current invention is directed to a composition comprising a biopolymer additive. In combination with water, the additive functions as a soil conditioner. The additive comprises complex galactomannan-rich polysaccharide biopolymers derived from succulent plants. The succulent plant-derived biopolymer additive may be used alone or in combination with polymers and copolymers of polyacrylamide (PAM). The combination of the succulent derived additive (SDA) and PAM has a synergistic effect that yields unexpected results so that the resulting composition is a more effective treatment composition than either SDA or the PAM alone.

The current invention is also directed to a method of making an additive composition. In accordance with the method of the current invention, portions of succulent plants are first selected. The selected portions are ground and processed into a slurry. Alternatively, viscous liquids (e.g. sap) are directly extracted to obtain the slurry. The slurry is then dried and ground into a powder so that the powder can be reconstituted when the additive is used. In one embodiment, polymers or copolymers of polyacrylamide are added to the composition.

DETAILED DESCRIPTION OF PREFERRED EMBODIMENTS

Figure 1:
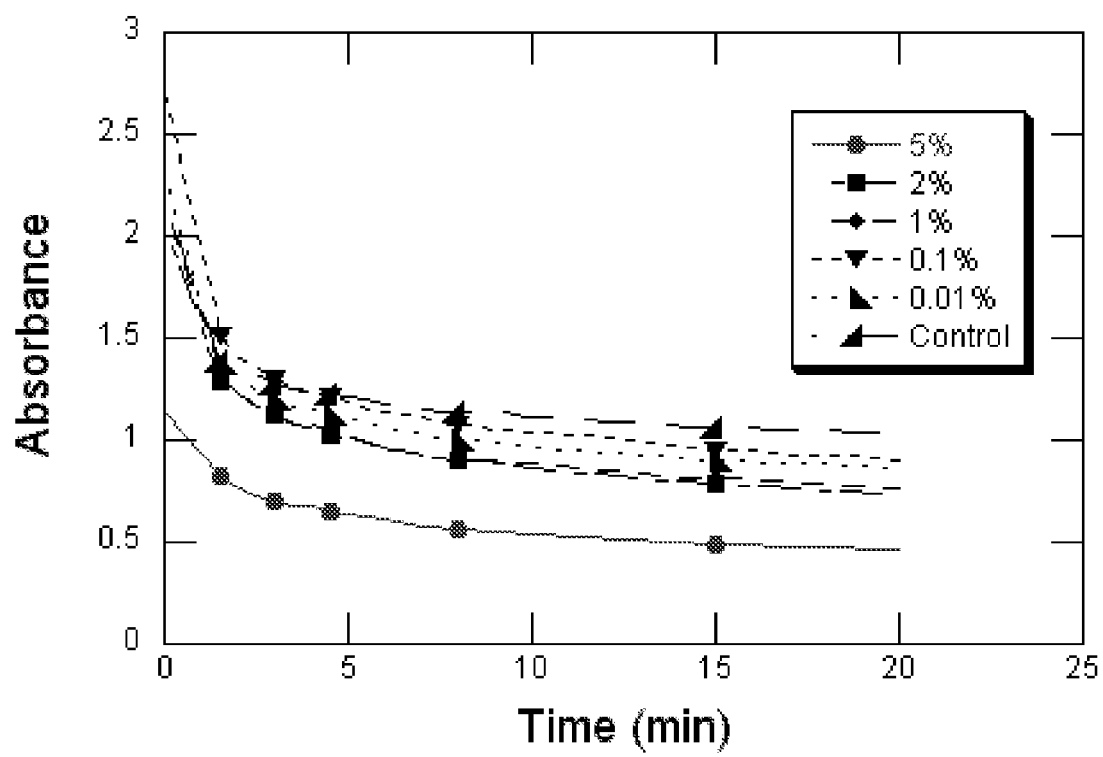
FIG. 1 comprises representative soil flocculation test results for soil/water samples that include the SDA of the current invention.

As discussed supra, the present invention comprises a biopolymer additive that, in combination with water, functions as a soil conditioner. The additive comprises complex galactomannan-rich polysaccharide biopolymers derived from succulent plants.

Conventionally and for the purposes of this disclosure, "succulent plants" are defined as plants with fleshy, thick tissues adapted to water storage. Some succulents (e.g., cactus) store water only in the stem and have no leaves or very small leaves; others (e.g., agaves) store water mainly in the leaves. Most have deep or broad root systems and are native to either deserts or regions that have a semiarid season.

Conventionally and for the purpose of this disclosure, one or more members of the following plant families should be considered to be succulents: Agavaceae, Aizoaceae, Amaranthaceae, Amaryllidaceae, Anacardiaceae, Apiaceae, Apocynaceae, raceae, Araliaceae, Asparagaceae, Asphodelaceae, Asteraceae, Balsaminaceae, Basellaceae, Begoniaceae, Bombacaceae, Boraginaceae, Brassicaceae, Bromeliaceae, Burseraceae, Cactaceae, Campanulaceae, Capparidaceae, Caricaceae, Chenopodiaceae, Cochlospermaceae, Commelinaceae, Convolvulaceae, Crassulaceae, Cucurbitaceae, Didiereaceae, Dioscoreaceae, Doryanthaceae, Ericaceae, Eriospermaceae, Euphorbiaceae, Fabaceae, Fouquieriaceae, Geraniaceae, Gesneriaceae, Hyacinthaceae, Hypoxidaceae, Icacinaceae, Iridaceae, Lamiaceae, Lentibulariaceae, Loasaceae, Loranthaceae, Melastomataceae, Meliaceae, Menispermaceae, Molluginaceae, Moraceae, Moringaceae, Nolanaceae, Nolinaceae, Orchidaceae, Oxalidaceae, Passifloraceae, Pedaliaceae, Phyllanthaceae, Phytolaccaceae, Piperaceae, Poaceae, Portulacaceae, Rubiaceae, Ruscaceae, Sapindaceae, Saxifragaceae, Sterculiaceae, Urticaceae, Viscaceae, Vitaceae, Xanthorrhoeaceae, and Zygophyllaceae.

Succulent plants of particular interest to the inventors include (but are not limited to) plants from the Cactaceae family (for example prickly pear cactus), Asphodelaceae family (for example aloe), and the Agavaceae family (for example agave). Although not conventionally considered a succulent, for the purpose of this disclosure, plants from the Malvaceae family (for example okra) should also be considered a succulent plant.

In accordance with the current invention, complex galactomannan-rich polysaccharides are derived from the succulent plants and used as additives. These succulent (plant) derived additives (SDAs) may be used as soil conditioners, flocculating agents, binders, and the like. Multiple preparation and application modes are possible with these SDAs. Effective applications include (1) extracting viscous liquids (e.g. sap) from selected ground or unprocessed plant tissues and directly applying the extracted liquids; (2) applying powered succulent plant materials that become reconstituted during use; (3) purifying glactomannon polysaccharides extracted from succulent plant tissues and then applying the polysaccharides in their purified form.

In the preferred embodiment, the flesh of a succulent (for example a prickly pear cactus) is selected and sliced into small cubes. The cubes are placed in an industrial blender or fiber digester and processed into a pulp slurry. The slurry is dried and ground by a standard mill into a powder (less than an 80 mesh). The powdered SDA is easily stored and transported, and then reconstituted by adding water when the SDA is ready to use.

Significantly, the inventors found that there is a notable synergistic effect when SDA biopolymers are used in combination with current commercial flocculants, specifically copolymers of acrylate and acrylamide i.e. PAM. The discovery of this synergistic effect results in the use of highly effective and economic formulations that include both SDA and PAM. Other bio-material type supplemental additives may be used either alone or in combination with SDA and/or PAM. These supplemental additives include cellulose xanthate, chitosan, starch xanthate, cellulose microfibrils, organic and inorganic salts.

The SDA additive of the current invention may be applied alone or in combination with PAM or one or more of the supplemental additives. The ratio of active ingredient in water is in the range 0.2-300 ppm, preferably 10 to 100 ppm. Levels of 5-50 ppm are generally found to be effective. SDA additive compositions generally contain active components in a ratio between 1:1 and 50:1, preferably between 5:1 and 20:1.

As noted supra, crystalline cellulose microfibrils may comprise an additional additive or may be used as a supplement to SDA and/or PAM. Cellulose microfibrils are charged nanoscale crystallites isolated from cellulose sources usually by acid hydrolysis. Typical cellulose microfibrils are long crystalline "needles" ranging in size from 10-20 nm in width, with an average length of 100-400 nm. Sources of cellulose microfibrils are widely diverse, and provide a wide range of potential nanoparticle properties. Sources include wood, straw, cotton, bacteria, and sea animals.

Organic salts may also be useful as an additive or may be used as a supplement to SDA and/or PAM, particularly in highly calcareous soil that does not respond well to PAM alone. Organic salts with exchangeable calcium (gypsum) or other ions improve electrical conductances and thereby reduce erosion losses in clay-rich soils. Calcium, in the form of gypsum or calcium nitrate fertilizer, can be a potential boon for controlling erosion and improving infiltration in soils low in exchangeable divalent base cations. Test results suggest that calcium and polymer treatments in tandem may improve erosion control.

The use of organic salts should not be limited to calcium; other ionic salts are also effective in soil treatment compositions. Inorganic salts may also be added to these compositions to reduce viscosity, particular for more concentrated formulations. Specifically, many of the active ingredients in soil treatment compositions are charged; adding a salt to charged polymer materials in aqueous solution or suspension changes the viscosity of the mixture and improves the handling qualities.

Flocculation Test Data

Static soil binding properties were evaluated by means of a series of soil-cuvette flocculation assays. The soil used in the assays was obtained from the US Department of Agriculture (USDA), Agricultural Research Service (ARS) test site in Kimberly, Id., and from a number of different sites in California's Central Valley, including Patterson, Calif.

In the assays, a 25 mg soil sample was suspended in 10 ml distilled water and 0.1 M $CaCl_2$. The sample was mixed thoroughly via a vortex mixer. A test additive composition was pipetted into the cuvette from a stock solution. The suspension was stirred gently and then allowed to settle. Aliquots were withdrawn from the suspended samples, and the absorbance was measured at intervals at a specific light wavelength (for example, 400 nm) to determine relative scattering of the suspensions.

Absorbance was recorded at 3 seconds then at 10 second intervals over a total of at least 20 minutes using the kinetics program of a Shimadzu UV-Vis UV1601 spectrophotometer. Sediment concentration was determined by measuring turbidity using the spectrophotometer. Turbidity was calibrated by using a set of pre-weighed soil dispersions. The relative suspended solids content was determined for at least 5 replicate samples at each condition.

Decrease in light scattering, as described by reduction in absorbance, was correlated to reductions in suspended soil particles versus time. Higher rates and total amount of decrease corresponded to increased flocculation activity accompanied by more rapid clarification of the fluid. Representative results from the flocculation assays are shown in FIGS. 1 and 2.

FIG. 1 shows representative results of a first assay series. The first assay series compared varying amounts of SDA with a control containing no additives. As shown in FIG. 1, the clarity of the water generally improved as the concentration of SDA was increased from 0.01 to 5%.

Figure 2:
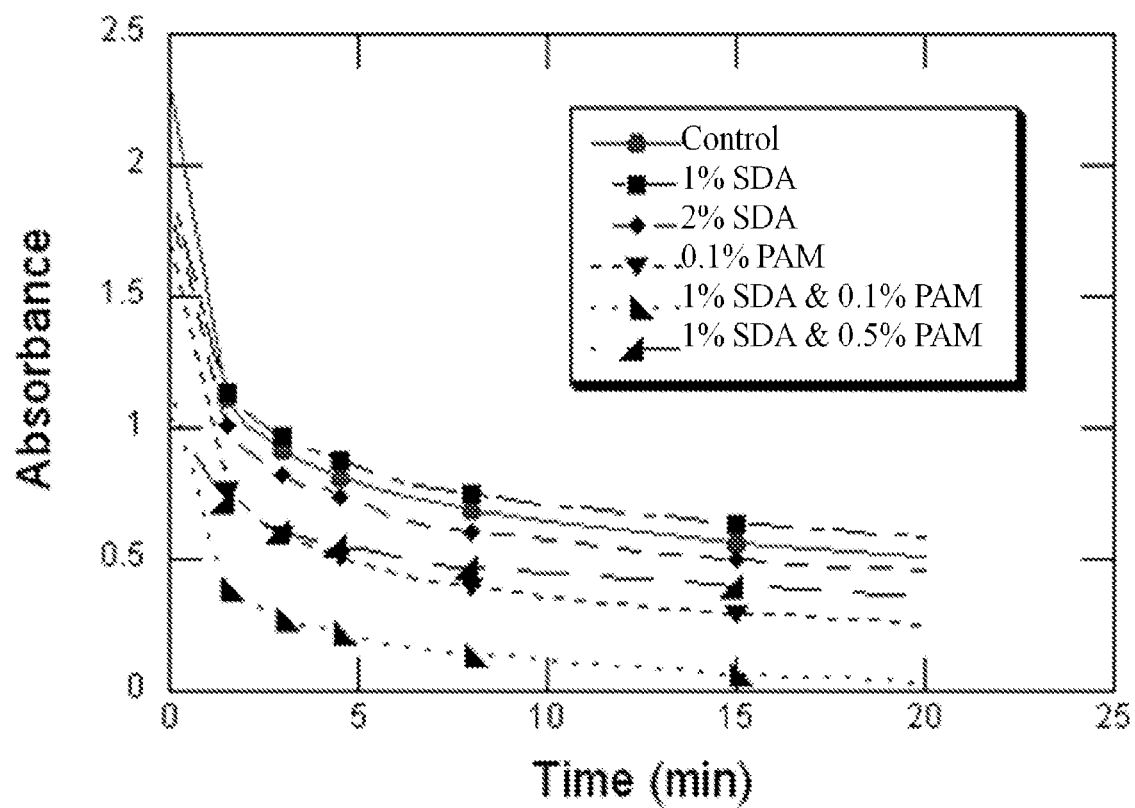
FIG. 2 comprises representative soil flocculation test results for soil/water samples that include SDA of the current invention both alone and in combination with PAM compositions.

FIG. 2 shows representative results of a second assay series. The second assay compared the control with SDA alone and SDA in combination with selected amounts of PAM. The second assay series confirmed the synergistic relationship between PAM and SDA seen in other tests conducted by the inventors. Specifically, the second assay series showed that a combination of 1% SDA and 0.1% PAM yielded better results than PAM or SDA alone.

Lab-Scale Soil Erosion Tests

Figure 3:
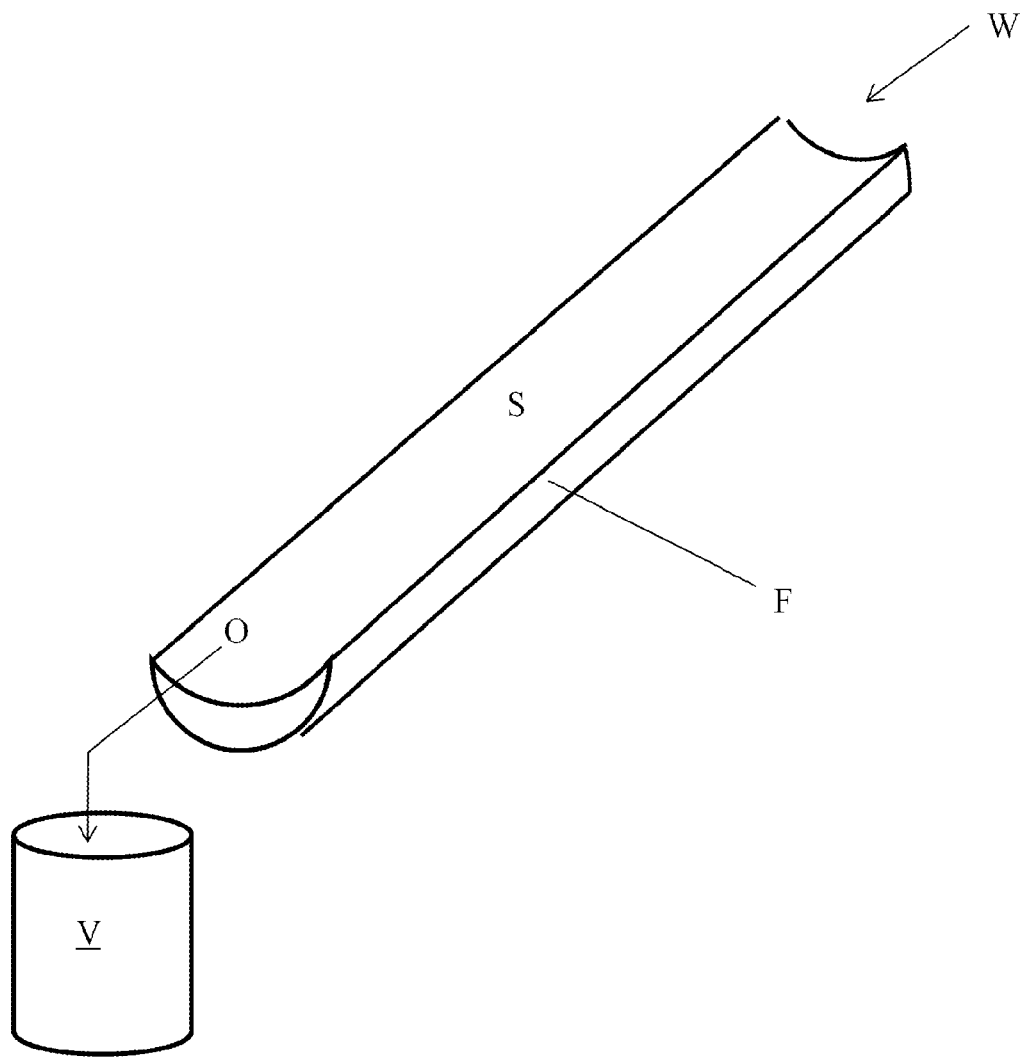
FIG. 3 is a schematic of a lab-scale furrow test apparatus.

To evaluate the erosion prevention potential of the bio-materials of the current invention, the inventors devised a lab-scale test system and tested various SDA compositions. A simplified schematic of the lab-scale erosion evaluation system is shown in FIG. 3. In the evaluation system, water, with and without additives, was directed down a simulated furrow F in the direction of the arrow W. Water flow was provided using a calibrated peristaltic pump typically operating at 20 ml/min. The furrows F were comprised of six foot lengths of polyurethane pipe insulation cut into half cylinders and inclined on support scaffolding.

The slope of the simulated furrows F was set between 2 and 30 degrees with 10 degrees used for most measurements. A 200 g coating of soil S was distributed along the length of the furrow F. The surface of the soil was pressed into a concave shape to simulate an actual furrow. The outflow O from the furrow F was collected in a sampling vial V at the bottom of the furrow F.

The stability of the soil surface is affected by the presence or absence of additive, which forms flocs at the water-soil interface. The amount of soil and water collected during a predetermined time period was measured by (1) the absorbence method used in the cuvette test described supra, (2) drying and weighing the sediment collected, or (3) measuring the height of sediment collected in standard (thin) flasks. Low levels of erosion imply that an additive was effective in retaining sediment.

Figure 4:
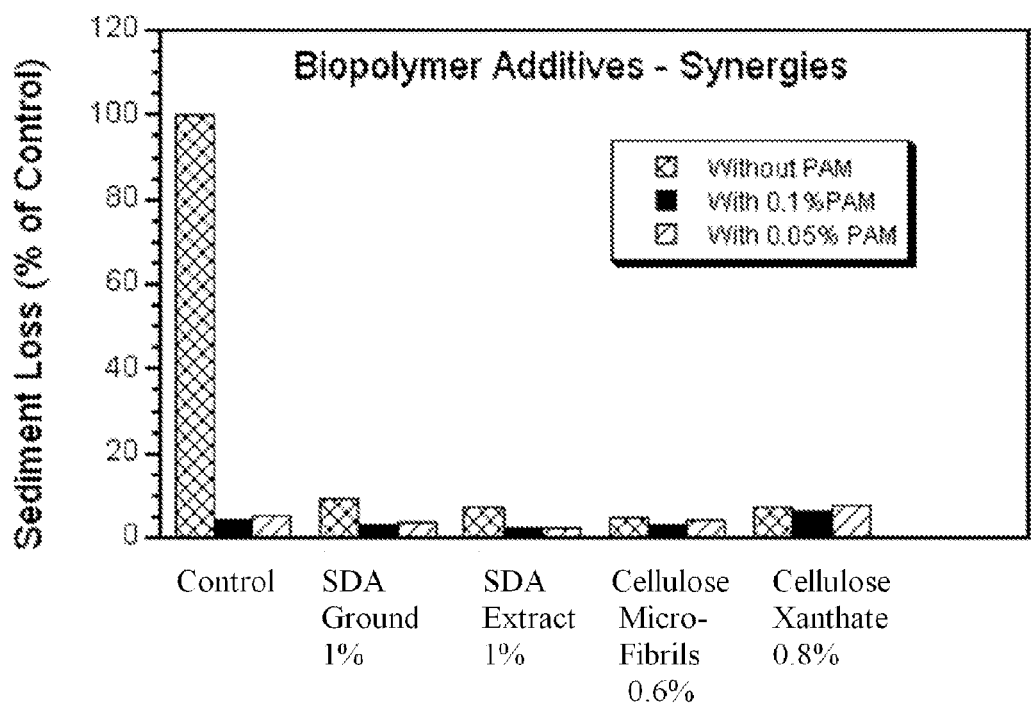
FIG. 4 comprises representative erosion test results using the lab-scale furrow test apparatus.

As shown in FIG. 4, the results of the lab-scale evaluation indicate that all of the tested compositions were relatively effective and performed much better than the control sample with no additive. The tests generally confirmed that the best results were realized when the bio-materials were combined with PAM. The combination of the bio-materials and PAM generally (and unexpectedly) yielded better results than the bio-materials alone or PAM alone. The very best results were achieved by a combination of either 0.1% or 0.5% PAM in combination with SDA.

Field Erosion Tests

After the lab-scale tests were completed, field tests were conducted at the sites where soil samples used in the earlier lab tests originated. Specifically, field furrow studies in Idaho were conducted at the USDA-ARS Northwest Irrigation and Soils Research Laboratory at Kimberly, Id. The soil was a highly erodible Portneuf silt loam (coarse-silty, mixed, mesic, Durixerollic Calciorthid). The furrows used in the initial test had a slope of 1.5% and a length of 137 m. Irrigation water was from the Snake River, with an average electrical conductivity (ECO) of 0.5 dSm-1 and a sodium adsorption ratio (SAR) of 0.6. Irrigation water was applied from individually regulated valves on gated pipe to conventionally prepared furrows between rows of silage corn.

During the initial field tests, the water inflow rate was set at approximately 6 gal/min and additive samples were metered into the flow at the top of each furrow via calibrated peristaltic injection pumps. Sediment content was measured at the end of furrows by collecting 1 L of sample and measuring sediment using the Imhoff cone technique, and pre-calibrated turbidity measurements. Comparisons of experimental results were made in side-by-side assessments relative to control treatments with no additives and with commercial PAM.

In further furrow irrigation tests, typical flows ranged in general from 5 to 7 gallons per minute and up to 12 gallons per minute. Furrows typically ranged from 100 to 200 meters, but were up to ½ mile in length in some cases. Dosing typically was between 1 and 30 ppm of active agents. In spray irrigation, typical applications were 2 to 3 pounds of active agents injected into 0.06 acre-foot of water per acre using standard irrigation application equipment.

The results of the field tests generally confirmed the lab scale furrow test, indicating that the best results were achieved by a combination of PAM and SDA.

For the foregoing reasons, it is clear that the invention provides an innovative composition that has the potential to reduce the cost and the environmental impact of currently available synthetic soil/water treatments either by combining the currently used synthetic polymers with biopolymers, or completely replacing the synthetic polymers with biopolymers. The invention may be modified in multiple ways and applied in various technological applications. For example, although much of the discussion is directed toward the use of biopolymers as erosion control agents, these polymers may also be used to prevent water infiltration in (for example) irrigation canals and the like.

The current invention may be modified and customized as required by a specific operation or application, and the individual components may be modified and defined, as required, to achieve the desired result. Such variations are not to be regarded as a departure from the spirit and scope of the invention, and all such modifications as would be obvious to one skilled in the art are intended to be included within the scope of the following claims.

What is claimed is:

1. A soil conditioner comprising a succulent plant derived additive (SDA), water, and a synthetic additive in combination to comprise the soil conditioner, wherein the soil conditioner is structured to modify a soil to water interface so that the composition controls erosion or water infiltration.

2. The soil conditioner of claim 1 wherein the soil conditioner comprises a flocculent.

3. The soil conditioner of claim 1 wherein the SDA is combined with water so that the SDA in the water is in the range of 0.01% and 10%.

4. The soil conditioner of claim 1 wherein the SDA is combined with water so that the SDA in the water is in the range of 0.2 to 300 ppm.

5. The soil conditioner of claim 1 further comprising supplemental additives selected from a group consisting of: cellulose xanthate, chitosan, starch xanthate, cellulose microfibrils, organic and inorganic salts.

6. The soil conditioner of claim 1 wherein the SDA is derived from a plant family selected from a group consisting of Cactaceae, Asphodelacae, Agavaceae, and Malvaceae.

7. The soil conditioner of claim 1 wherein the SDA is derived from a plant selected from a group consisting of cactus, aloe, agave, and okra.

8. The soil conditioner of claim 1 wherein the synthetic additive comprises polymers and copolymers of polyacrylamide (PAM).

9. The soil conditioner of claim 8 wherein the soil conditioner further comprises PAM in the range of 0.001% and 5%.

10. The soil conditioner of claim 8 further comprising supplemental additives selected from a group consisting of: cellulose xanthate, chitosan, starch xanthate, cellulose microfibrils, organic and inorganic salts.

11. The soil conditioner of claim 8 wherein the SDA is derived from a plant family selected from a group consisting of Cactaceae, Asphodelacae, Agavaceae, and Malvaceae.

12. The soil conditioner of claim 8 wherein the SDA is derived from a plant selected from a group consisting of cactus, aloe, agave, and okra.

13. A soil-conditioning additive composition comprising SDA in combination with PAM wherein, in combination with water, the SDA comprises between 0.01% and 10%, and the PAM comprises between 0.01% and 5%.

14. The soil conditioner of claim 1 wherein the SDA comprises extracted viscous liquids so that the composition comprises the SDA extracted viscous liquids in combination with the synthetic additive.

* * * * *